Oct. 28, 1958    P. MAURER    2,857,711
APPARATUS FOR MAKING ELECTRON DEVICE STEMS
Filed Jan. 31, 1955    13 Sheets-Sheet 7
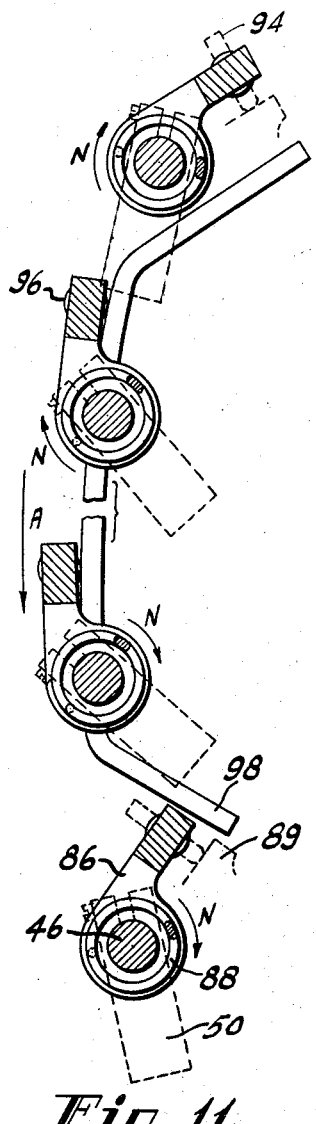
Fig. 11.
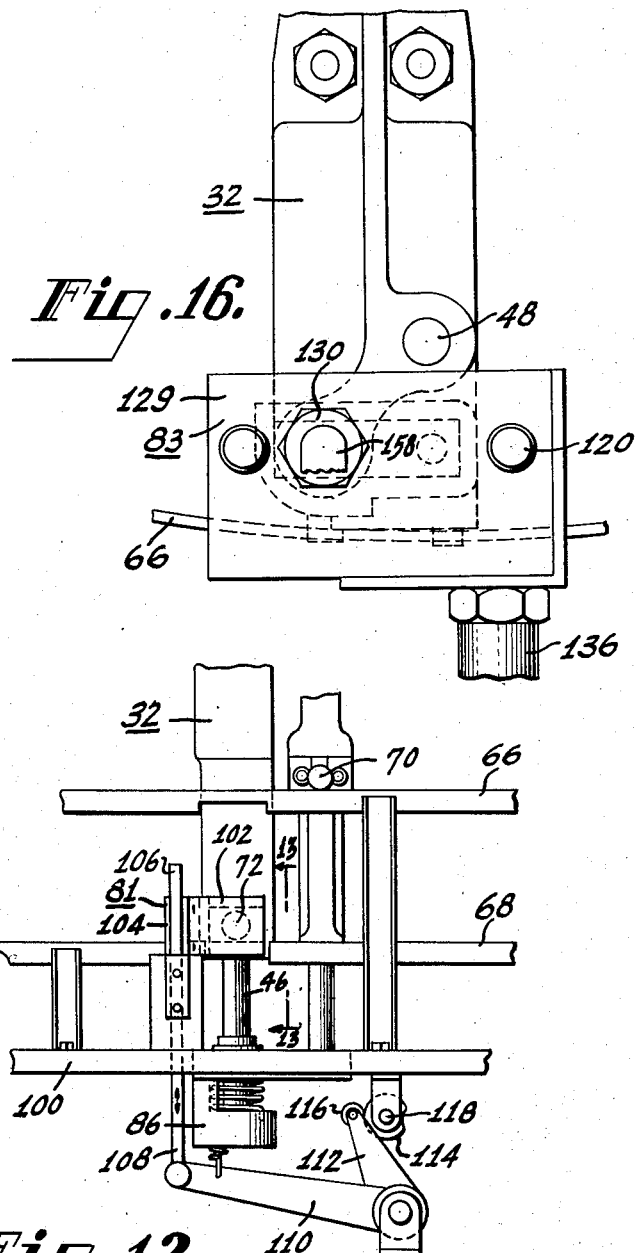
Fig. 16.
Fig. 12
INVENTOR.
Pierre Maurer
BY
William A. Zalesak
ATTORNEY

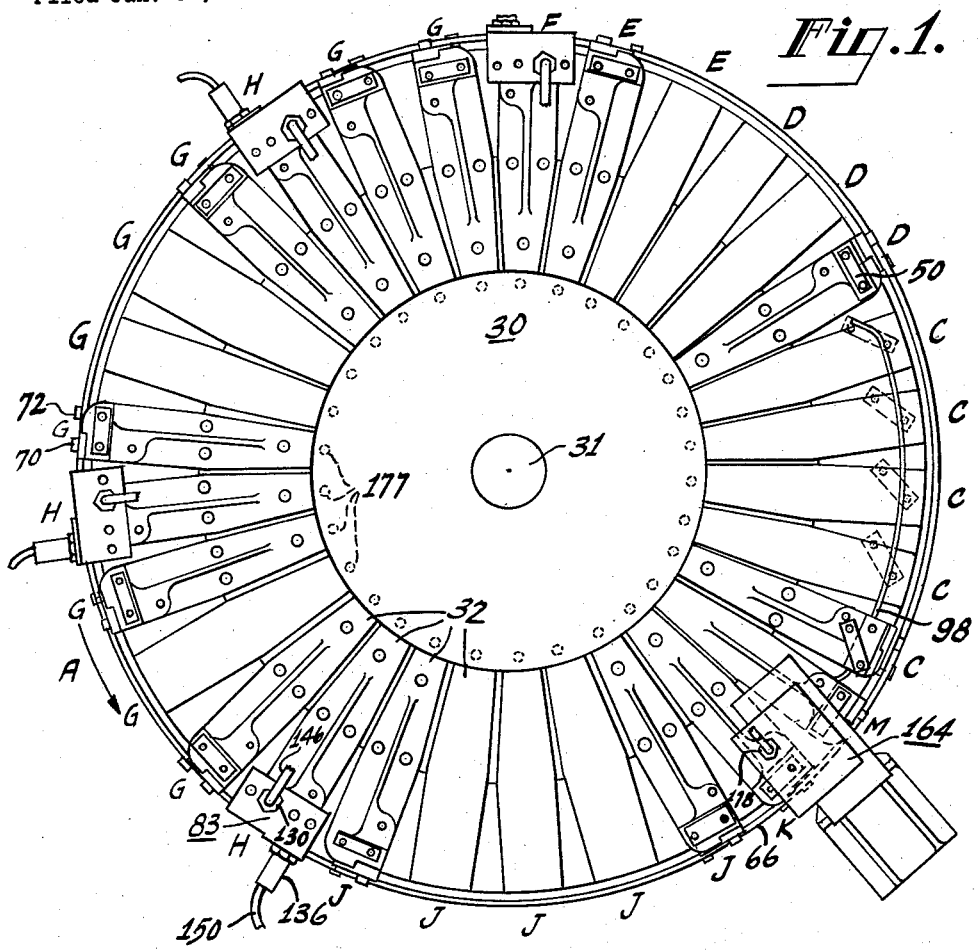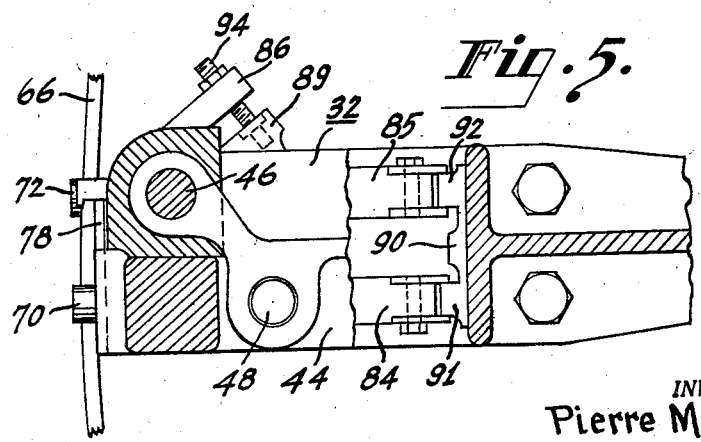

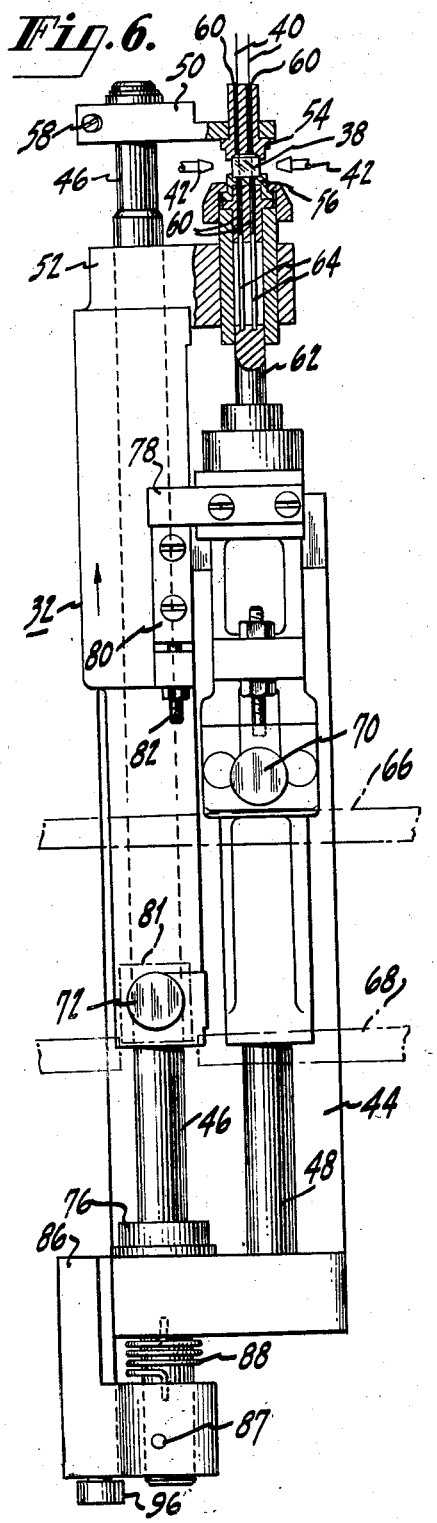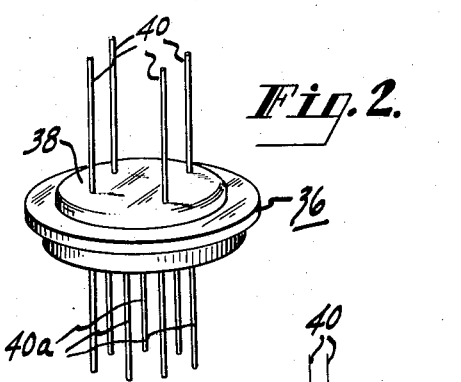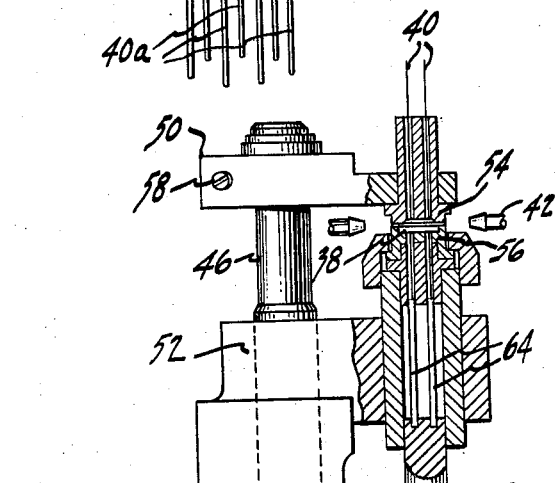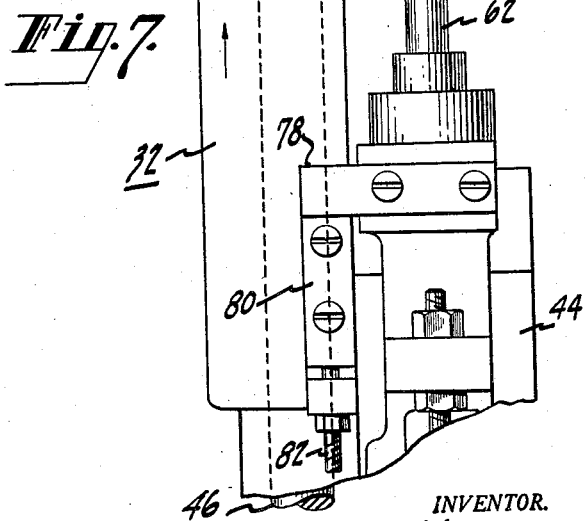
INVENTOR.
Pierre Maurer
BY William A. Zalesak
ATTORNEY Oct. 28, 1958 P. MAURER 2,857,711
APPARATUS FOR MAKING ELECTRON DEVICE STEMS
Filed Jan. 31, 1955 13 Sheets-Sheet 3
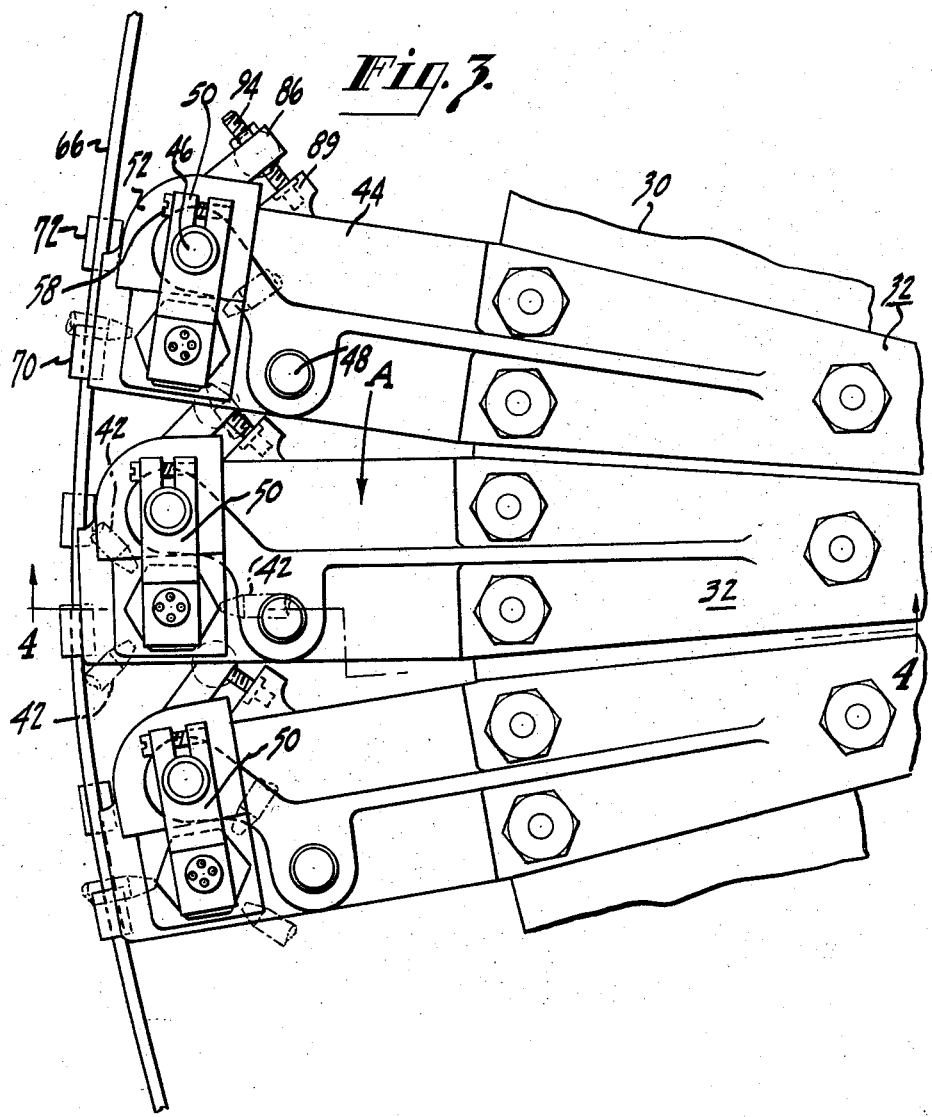
INVENTOR.
Pierre Maurer
BY
William A. Zaleski
ATTORNEY

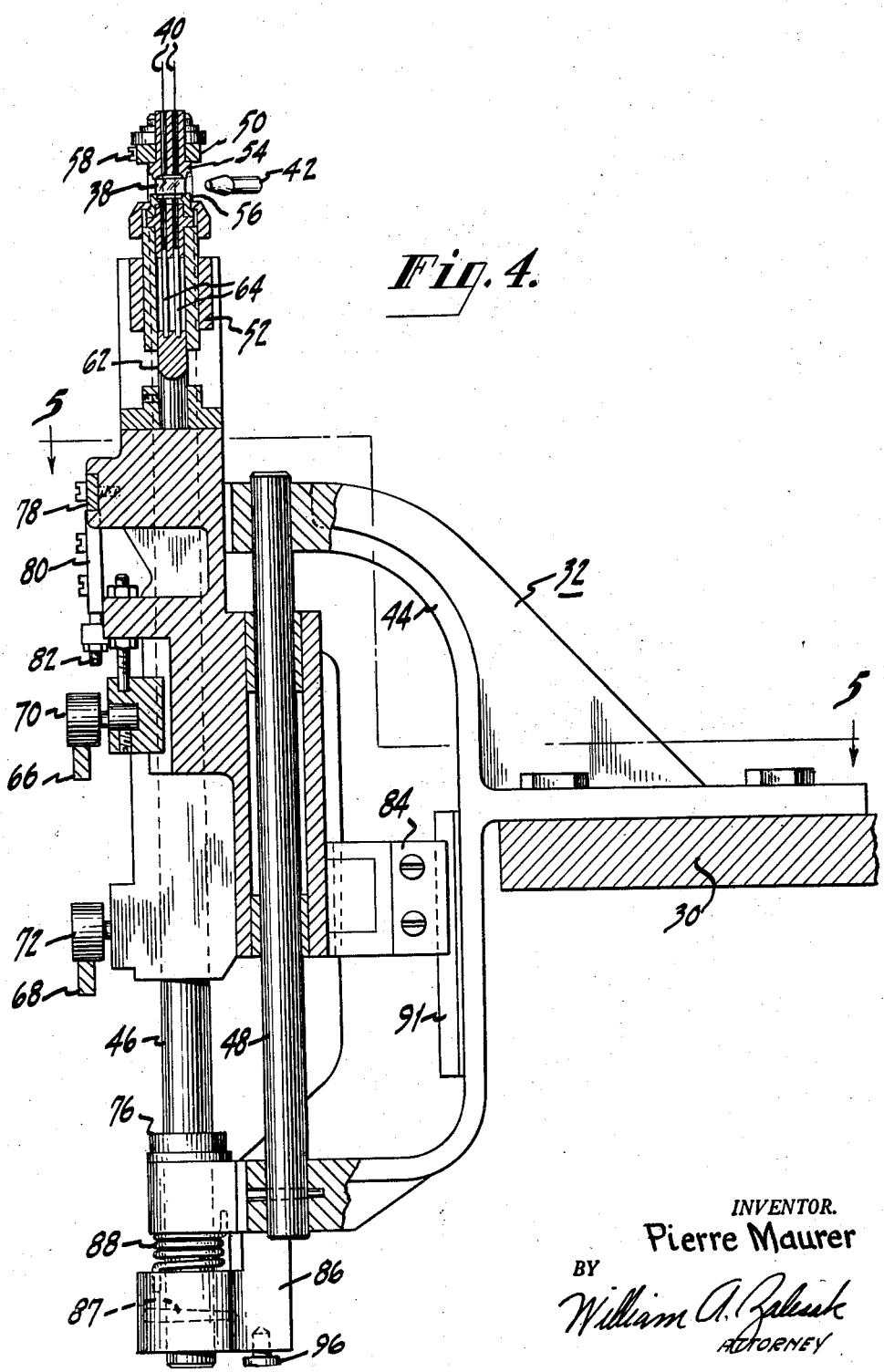

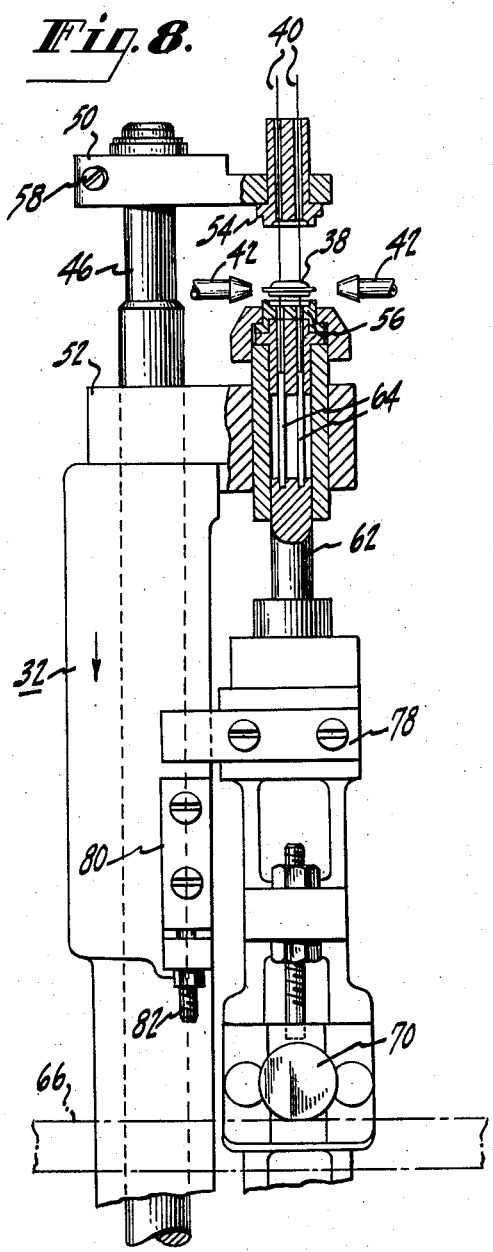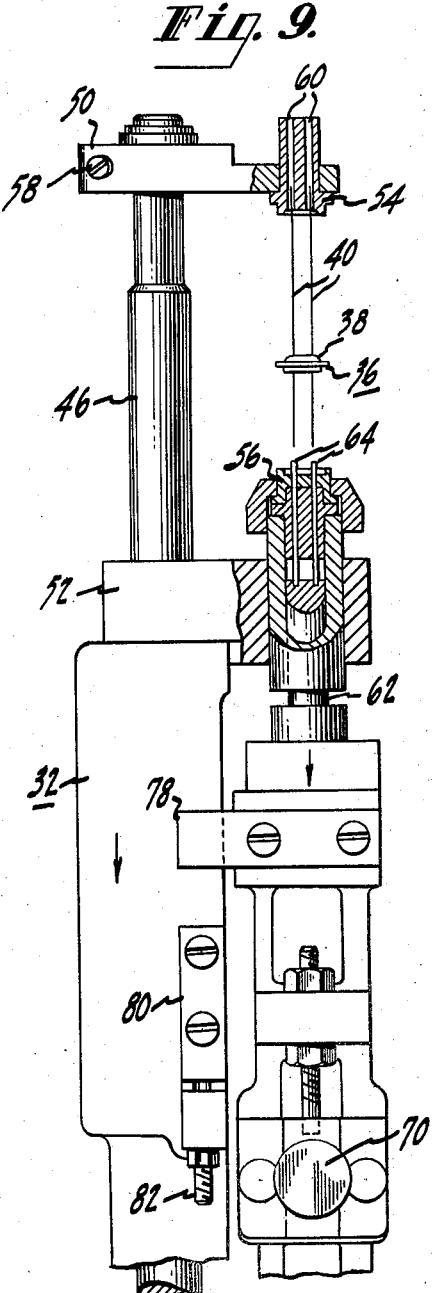
INVENTOR.
Pierre Maurer

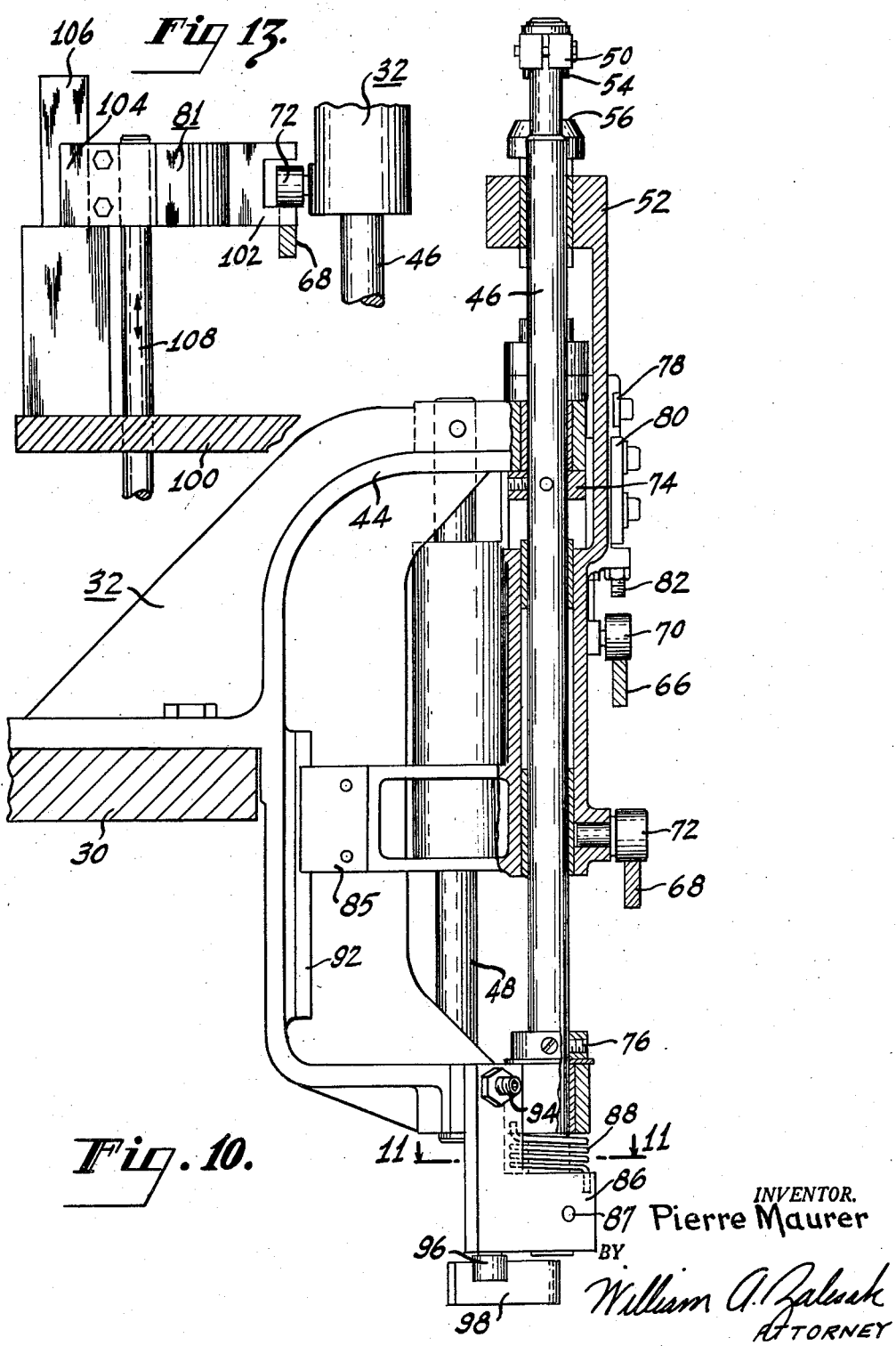

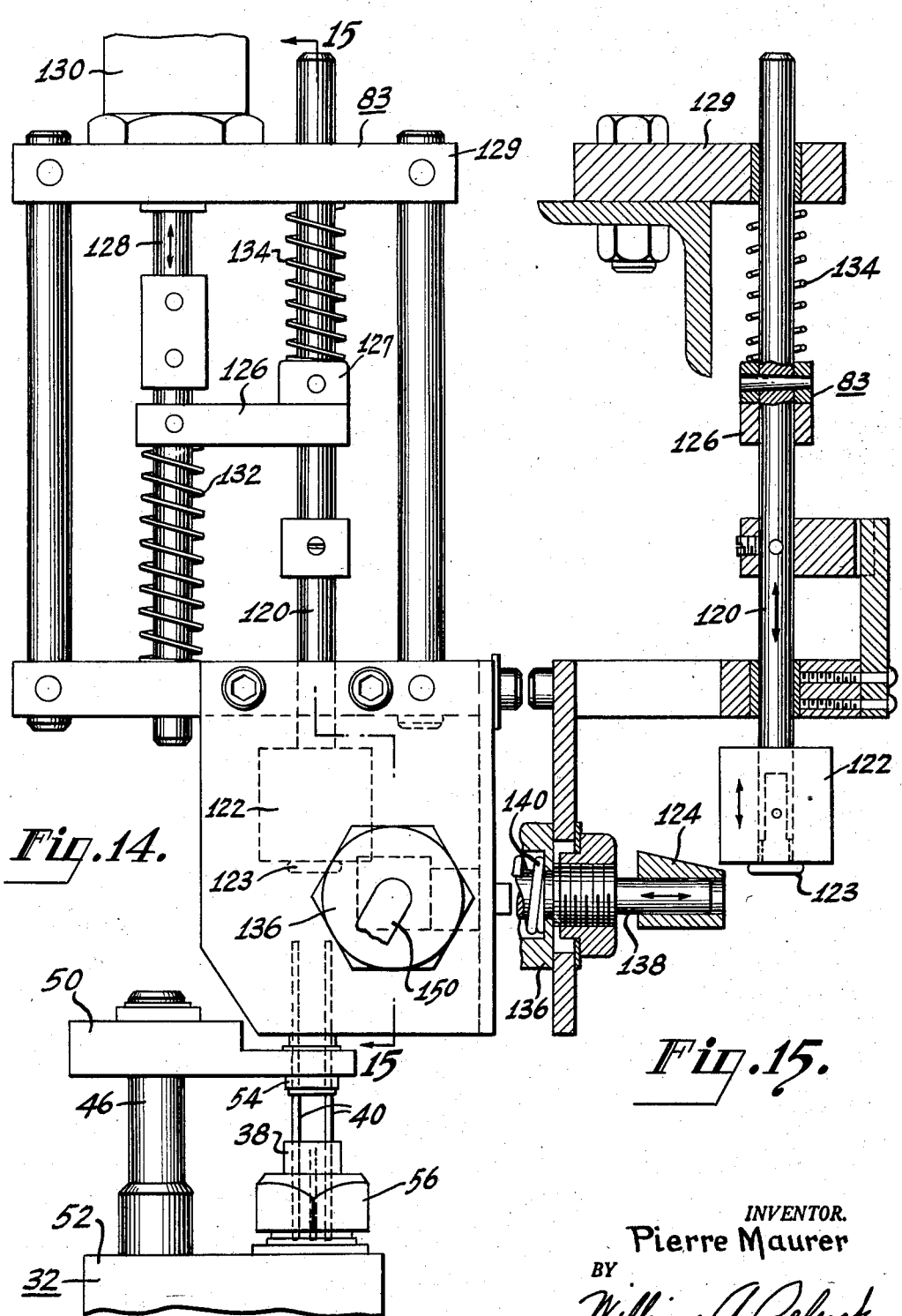

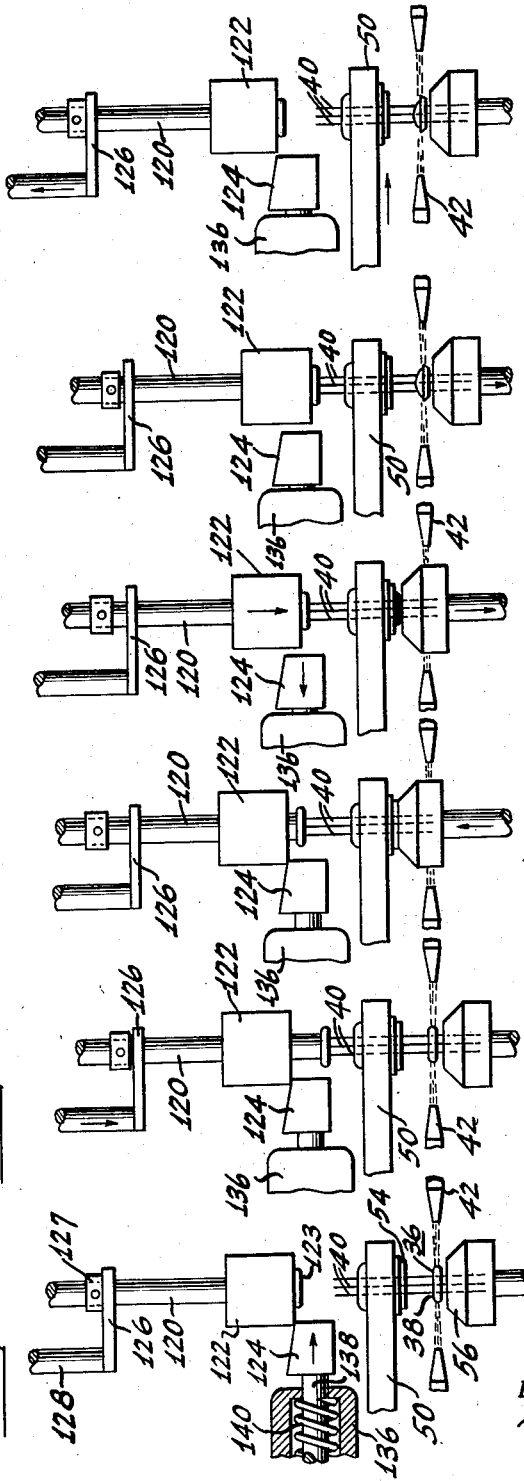

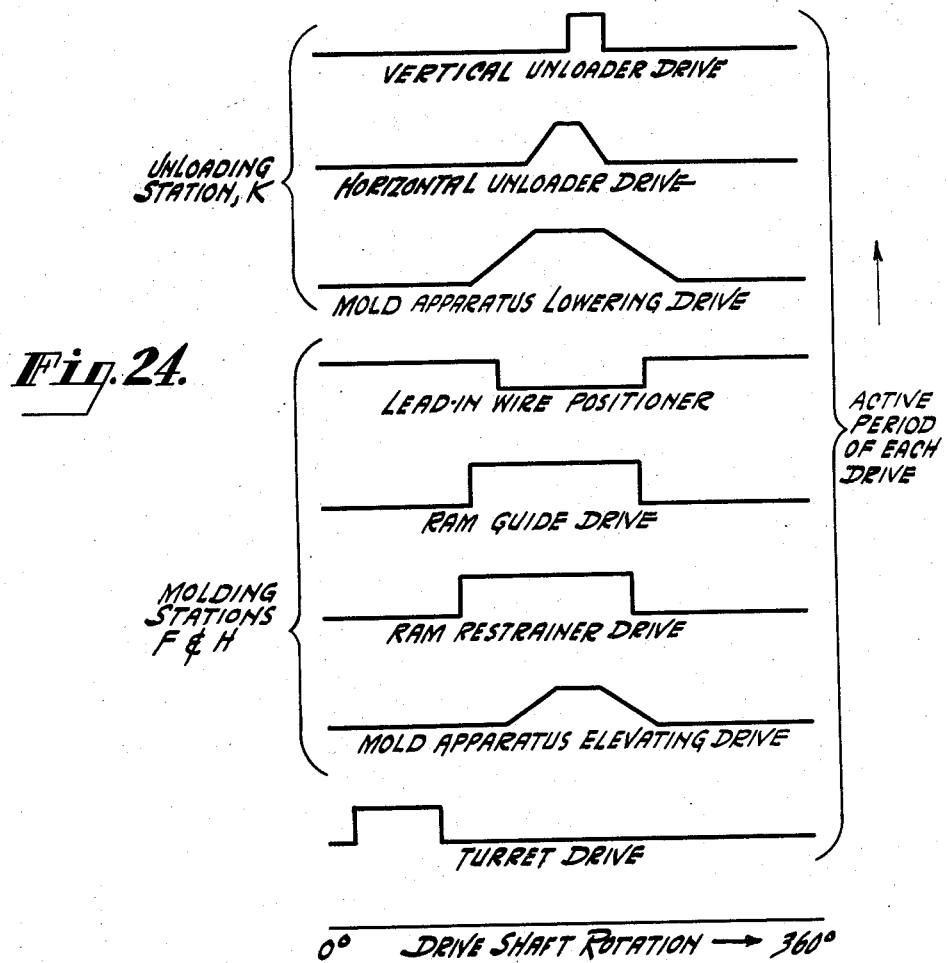

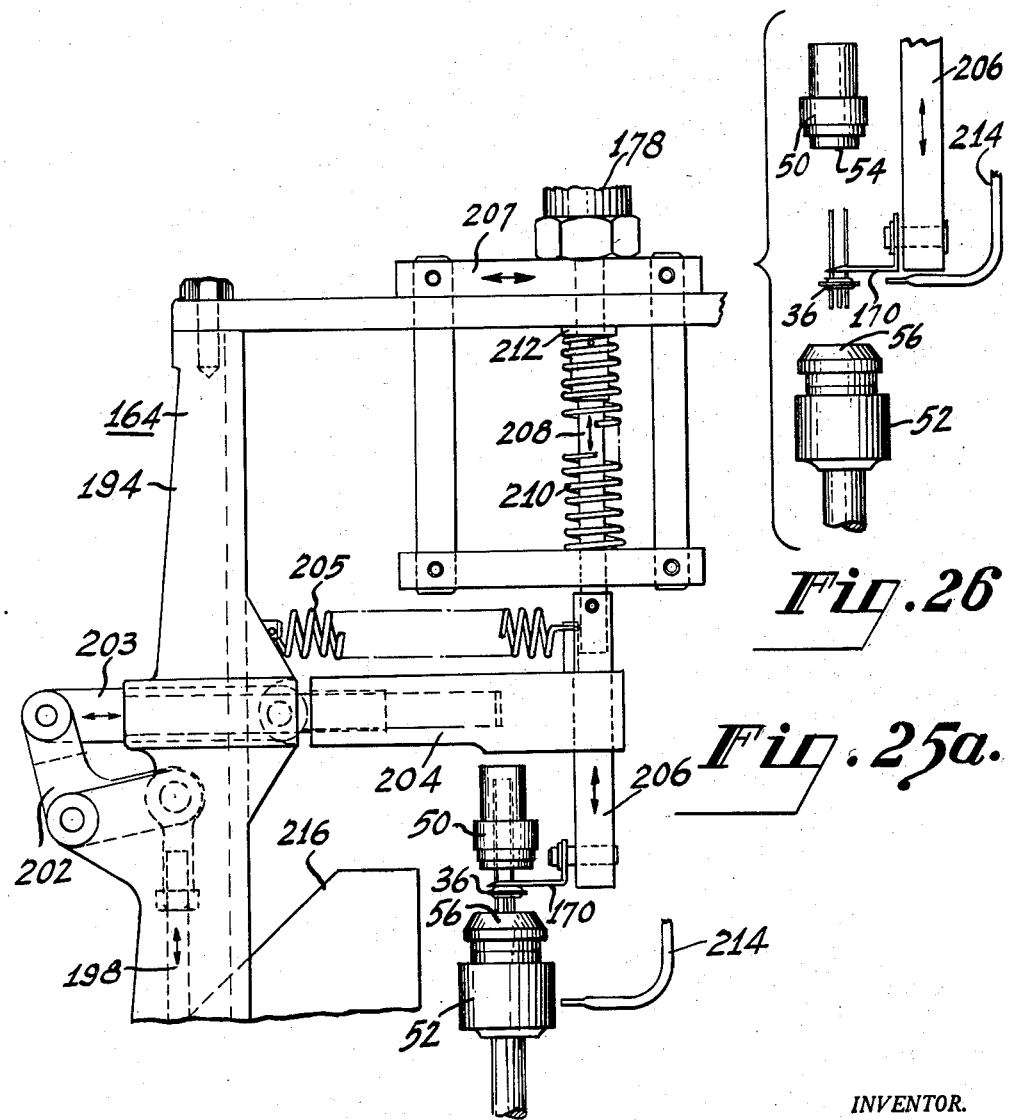

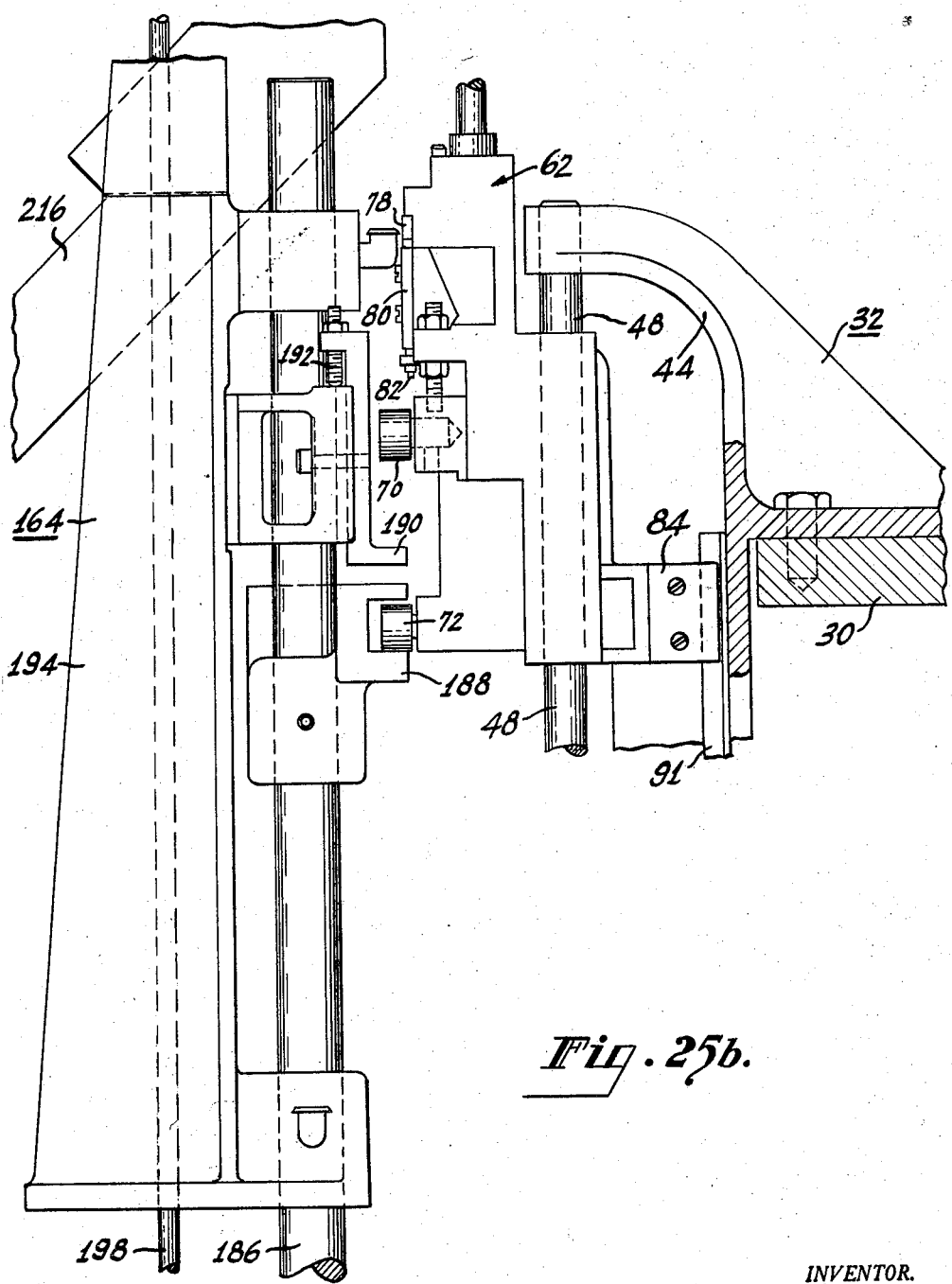

United States Patent Office 2,857,711
Patented Oct. 28, 1958

2,857,711

APPARATUS FOR MAKING ELECTRON DEVICE STEMS

Pierre Maurer, Nutley, N. J., assignor to Radio Corporation of America, a corporation of Delaware Application January 31, 1955, Serial No. 485,190

7 Claims. (Cl. 49—1)

This invention relates to apparatus for making a composite glass-metal sub-assembly known as an electron device stem. More particularly, the invention concerns improved apparatus for making electron device stems of the variety known as electron tube stems and semiconductor device stems, and wherein a plurality of metallic members are sealed into a molded member. An electron device stem, which may be of a flat or button shape, usually includes a flat member of a material such as glass and through which extend a plurality of lead-in wires.

Such a stem is usually formed from a glass tube. The practice usually followed in making a button-shaped stem is to dispose a plurality of lead-in wires within a glass tube and then form the glass tube to button shape. The glass tube is formed to button shape by heating the tube to a relatively soft plastic state by directing fires thereto and then pressing the softened glass by die or molding members to flatten the tube and seal it to portions of the lead-in wires.

A machine for making such stems usually comprises a movable support member or turret mounted for rotation about a vertical axis. The turret is provided with a plurality of vertically disposed mold assemblies regularly spaced in a circle concentric with the turret and adjacent to its outer periphery. The turret is rotated by indexing apparatus for effecting a regular intermittent rotation of the turret through a plurality of arcs of predetermined angular extent. Therefore, during its cycle of operation the turret traverses a plurality of stations at predetermined ones of which different operations are performed.

Previous machines for making electron tube stems have generally included mold assemblies in the form of spindles which were independently rotatable about their own axis and which had a driving connection common to all of them. In some of the previous machines the spindles were locked against rotation at each of the stations referred to and the desired operation performed. Each of the spindles comprised a lower mold adapted to press the glass against an upper mold to the desired shape. At each of the stations there has been provided a head having the upper mold and movable into pressing position in axial registry with the lower mold of the spindle and with corresponding radial portions of the molds disposed in coextensive relation.

The use of the rotating spindle described introduces a problem in maintaining a relatively close tolerance between the parts of which it is comprised. This is especially true in machines adapted to make molded stems for electron tubes known as sub-miniature tubes and semiconductor devices known as transistors and wherein stem diameters of the order of 9/32 inch are common.

Accordingly, one purpose of the invention is to provide an improved apparatus for making molded electron device stems having a molded member and a plurality of metallic members extending therefrom and comprising a rotatable turret and a plurality of self-contained mold assemblies entirely supported thereon.

It is a further purpose to provide improved apparatus for making relatively small sized electron device stems.

Stem making machines having rotatable lower molds have had each of the lower mold members thereof subject to both axial and radial misregistry with its upper mold. Since the lower spindle, and thus the lower mold, was mounted for rotation about its own axis, it was only indirectly connected and aligned with the upper mold. Machines having moving parts require that tolerances be allowed in the fit and therefore in the relative positioning of the parts. The accuracy of the registry of the parts with each other is therefore partly determined by the number of interconnecting parts and by the tolerances allowed. Consequently, in view of the relatively large number of interconnecting parts, previous stem making machines have proven unsatisfactory.

Therefore, another object of the invention is to provide improved apparatus for making molded electron device stems wherein the mold members of the apparatus are directly supported from a common member for reducing misalignment of the mold members with respect to each other.

When electron device stems have relatively thin and closely spaced lead-in wires, axial misregistry between the upper and lower molds has sometimes been greater than the diameter of a lead-in wire. In making button-like stems in which the lead-in wires pass through portions of the stem adjacent to the center thereof, alignment pins disposed adjacent to the center of the molds cannot be used for maintaining axial alignment thereof. Thus the axial alignment of the upper and lower molds in machines for making this type of stem has heretofore been unsatisfactory. Also, since the spindle is supported at only the lower portion thereof, the flexibility of the material of which the spindle is composed often tends to cause even greater misregistry between the stationary upper mold and the lower mold at the top of the rotatably mounted spindle.

It is therefore a further object of the invention to provide apparatus for making molded electron device stems in which said apparatus is characterized by improved alignment of the molding members thereof.

It is a related object of the invention to provide improved apparatus for making molded electron tube stems wherein said apparatus comprises a rotatable turret supporting a plurality of mold assemblies having upper and lower registrable die members and wherein the lower of the die members are supported for rectilinear axial movement only, with respect to the turret axis.

Another object of the invention is to provide improved electron tube stem making apparatus having mold members maintained in substantially fixed axial and radial alignment with respect to each other throughout a plurality of mold pressing operations.

In connection with the last named object of the invention, it is another object of the invention to provide stem making apparatus having supported on a common shaft, improved registrable molds and mold alignment-control members having guide portions, and wherein the guide portions are disposed at a greater distance normal to the shaft axis than the molds for improved registry of the molds.

Some sub-miniature tubes have electrodes which require more support than that provided by the usual relatively long and thin lead-in wires which extend through the tube stem for electrical access to the electrodes. It has been found convenient to supply the additional support by means of support wires fixed at one end thereof to the stem and extending inwardly of the tube. Previous machines for making electron tubes have proven unsatisfactory for sealing relatively thin wires to a flat glass member wherein some of the wires are relatively short and extend into, but not through, the glass member.

It is therefore a still further object of the invention to provide improved apparatus for making electron tube stems having a molded glass member and including relatively long wires extending through both sides of the glass member and shorter wires extending from one side only of the glass members.

Yet another object of the invention is to provide improved electron tube stem making apparatus comprising a rotatable turret supporting thereon a plurality of mold assemblies having axially alignable upper and lower mold members and wherein the upper mold member is swingingly mounted for arcuate movement out of axial alignment with the lower mold member for loading relatively short wire components of the stem directly into the lower member.

In order to insure that the relatively thin lead wires, of the relatively small stem referred to, be hermetically sealed to the glass member it is desirable, after subjecting the stem to a first molding operation so as to partly form it, to soften the portions of the glass adjacent to the lead wires and to subject the stem to an additional molding operation. However, previous stem making machines have not proven satisfactory in separating the partly formed glass member from its mold for subjecting the glass to additional heating and molding operations. Then, too, previous machines have often failed to eject a stem from the molds after all the molding operations have been performed. The relatively thin and long lead wires of the stem are subject to bending during the molding operations and tend to stick in the mold passageways adapted to receive the lead wires.

Accordingly, it is still another object of the invention to provide apparatus for making electron tube stems wherein said apparatus comprises vertically disposed registrable molds including improved means for raising a partly formed stem to a predetermined height above the lower mold for playing flames around and under the stem while the stem is supported in the molds.

A still further object of the invention is to provide apparatus for making electron tube stems of the molded variety and having improved means for ejecting completed stems from the apparatus.

According to the invention means are provided for attaining the foregoing objects.

While the invention is pointed out with particularity in the appended claims, it may be best understood from the following detailed description of an embodiment of the invention taken in connection with the appended drawing wherein like numerals refer to like parts. The figures of the drawing are grouped in several categories to facilitate a description of the aforementioned embodiment.

In these figures,

Figure 1 is a partly schematic top plan view of a portion of apparatus for making electron device stems according to the invention.

Figure 2 is a perspective view of an electron tube stem of the sub-miniature variety made by the apparatus depicted in Figure 1.

Figures 3 to 11 depict some of the mold assemblies of the apparatus wherein workpiece blanks are formed into electron device stems. Of these figures, Figure 3 is a fragmentary top plan view of the apparatus depicted in Figure 1 and showing in greater detail some of the mold assemblies depicted therein;

Figure 4 is a partially cut-away side elevational view of a mold assembly according to the invention and taken along line 4—4 of Figure 3;

Figure 5 is a partially cut-away sectional view taken along line 5—5 of Figure 4;

Figure 6 is a front elevational view, partly in section, of the mold assembly shown in Figure 4;

Figures 7 to 9 are partially cut-away, enlarged views of the mold assembly of Figure 6 showing positions of the assembly during some of the operations in the making of an electron device stem;

Figure 10 is a partially cut-away side elevational view of a mold assembly at the processing station lettered M in Figure 1; and Figure 11 is a sectional view taken along line 11—11 of Figure 10 and shows portions of four mold assemblies in different positions. One of these mold assemblies is the assembly shown in Figure 10 and the other three are behind the assembly shown in Figure 10.

Figures 12 and 13 show a mechanism for actuating the mold assemblies shown in Figures 3 to 11 to perform molding operations, and wherein;

Figure 12 is a cut-away, side elevational view of the mechanism for actuating the mold assemblies; and Figure 13 is an enlarged cut-away view taken along line 13—13 of Figure 12.

Figures 14 to 22 show a mechanism for disengaging a workpiece from a die member of a mold assembly. In this group of figures, Figures 14 to 16 show the structure of the workpiece disengaging mechanism, and more particularly:

Figure 14 is a front elevational view of the workpiece disengaging mechanism;

Figure 15 is a sectional view taken along line 15—15 of Figure 14 and showing a ram and ram guiding member of the disengaging mechanism;

Figure 16 is a top plan view of the mechanism shown in Figure 14 and shows the disengaging mechanism of Figures 14 and 15 in relation to the mold assemblies shown in Figures 3 to 11; and Figures 17 to 22 are cut-away side elevational views of the disengaging mechanism of Figure 15 and illustrate the operation of the disengaging mechanism by showing successive positions of portions of the mechanism during a step in the manufacture of an electron device stem.

Figure 23:
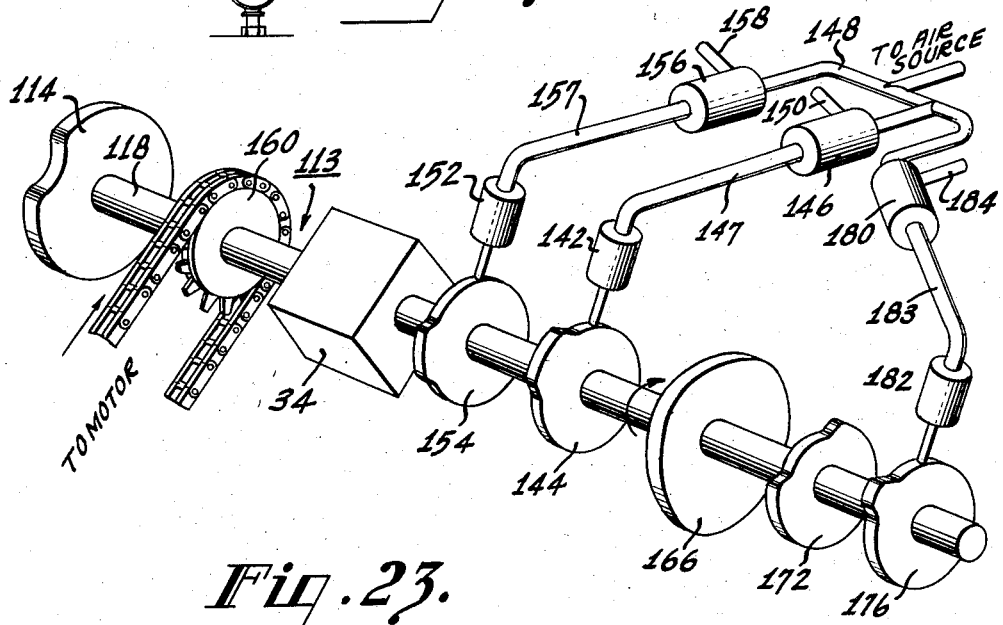

Figures 23 and 24 schematically depict driving means for the apparatus shown in Figure 1.

Figure 25C:
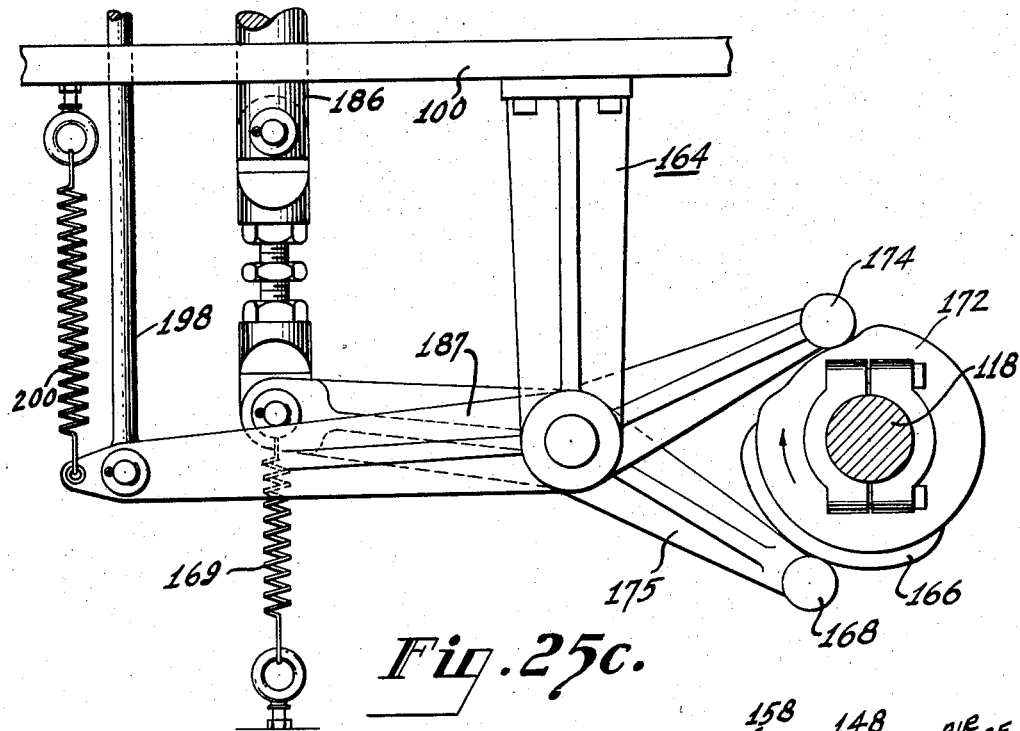

Figures 25a, 25b, and 25c are side elevational views of a mechanism for unloading a workpiece from a mold assembly of the type shown in Figures 3 to 11.

Figure 26 is a side elevational view of portions of the unloading mechanism illustrated in Figure 25a and shows members of the mechanism in a position unloading a workpiece from a mold assembly.

Figure 27 is a schematic view of a portion of the unloading apparatus shown in Figure 25a and illustrates four successive positions of an unloading member during an unloading operation.

In Figure 1 there is shown a partly schematic view of a portion of a machine embodying the invention for making electron device stems. The machine includes a movable support member or turret 30 of substantially circular shape supported by a shaft 31, the turret being disposed in a horizontal plane. The turret 30 supports a plurality of self-contained mold assemblies 32. The mold assemblies 32 are spaced in a circle concentric with the turret 30 and are fixed thereto adjacent to the outer periphery of the turret. The turret 30 is rotatable by indexing apparatus 34 which will be described in greater detail in connection with Figure 23. The indexing apparatus moves the turret 30 in intermittent rotational motions in the direction indicated by the arrow lettered A in the drawing. The motion of the turret positions each of the mold assemblies 32 successively adjacent to processing stations C to H, J, K, and M including heating and molding stations D to H.

In Figure 2 there is shown an electron tube stem 36 of the sub-miniature variety adapted to be made by the apparatus shown in Figure 1. The stem 36 includes a moldable member 38 of a material such as glass. There are sealed to the glass member 38 a plurality of lead-in wires 40. As has been previously explained, some sub-miniature tubes have electrodes which require more support than that provided by the usual number of lead-in wires which extend through the tube stem for electrical access to the electrodes. The stem 36 is thus provided with additional, relatively short lead-in wires 40a on one side thereof which extend into, but not through, the moldable member 38.

Figure 3 shows three of the mold assemblies 32 depicted in Figure 1. Each of the mold assemblies 32 is adapted to receive lead-in wires 40 and 40a (Figures 2, 4 and 6) and a moldable member in the form of a tube 38 around the lead-in wires, for processing at the stations referred to, to form a substantially flat glass stem 36 of the type shown in Figure 2. The lead-in wires and glass member are retained in one mold assembly throughout the manufacture of a stem.

At one or more of initial or loading stations, indicated by the letters C in Figure 1 of the drawing, the lead-in wires 40 and the glass tube 38 (Figure 4) are loaded into a mold assembly 32. At successive stations flames are played on the glass tube to heat it to the desired temperature. Gas burners 42, which are shown in Figure 3, may be used for this purpose. Successive stations are provided with oppositely oriented groups of three burners so that a glass tube receives, in effect, heat directed from six points during its travel through each set of two successive stations.

At the group of stations lettered D in Figure 1 of the drawing the glass tube is heated to a temperature below the softening point thereof in order to prepare it for a molding operation. Succeeding stations, lettered E, are provided with hotter flames until a molding or pressing station, F, is reached.

The glass tube is then subjected to a series of pressing operations to form the desired stem. While the glass tube may be heated to a plastic consistency and molded to shape in a single pressing operation, there is a chance that a portion of the relatively high pressure on the glass tube, which forces the glass inwardly into contact with the lead-in wires, may be transmitted to the lead-in wires thus deforming them. Thus it is desirable to mold the glass to shape in a series of steps and wherein none of the steps involves the transmission of enough pressure to the lead-in wires to deform them.

At the first of the pressing stations, F, the glass tube is softened, by suitably directed flames, to a partly plastic state, i. e. to a state wherein the glass is deformable but is not soft enough to move freely or to stick to the adjacent lead-in wires. While the glass is maintained in the plastic state the mold apparatus is actuated to perform a relatively light molding or pressing operation deforming the glass tube to a doughnut-like shape. At succeeding stations, G, the doughnut-shaped member is further softened by gas flames and then subjected to another, but heavier molding or pressing operation at another station, H. The latter pressing operation is similar to the first, light pressing operation described above except that in this operation the die members of the mold assembly are moved relatively close together pressing the doughnut-like member to a flat shape. The glass is sealed around the lead-in wires by this pressing operation to form hermetically tight seals. In order to insure that the flat glass member is properly formed and sealed to the lead-in wires, the glass member formed by the last mentioned pressing operation is re-heated to plastic consistency at succeeding stations, G, and then subjected to another heavy pressing operation at another station, H. It has been found that the use of three heavy pressing stations, H, insures that substantially all stems manufactured by the apparatus are properly formed. The stem is then subjected to annealing flames at annealing stations, J, to prevent the formation of strains in the glass portion of the stem during its cooling to ambient temperature. The stem is finally unloaded from the apparatus by unloading means at an unloading station, K.

The general features are discussed in greater detail below.

The mold assemblies

In Figures 4 and 6, there is shown a mold assembly 32 in greater detail. The mold assembly 32 includes a C-shaped frame 44 into which is mounted first and second shafts 46 and 48. The first shaft 46 supports molding members 54 and 56. The second shaft 48 supports lead-in wire disengaging means or a positioner 62 which will be described below.

The first shaft 46 is fixed to the C-frame 44 by means of collars 74 and 76 (which are shown in detail in Figure 10). This shaft 46 supports upper and lower arms 50 and 52 which in turn support, respectively, relatively movable upper and lower die members or molds 54 and 56. Both the upper and lower molds are provided with apertures 60 therethrough. The upper arm 50 is fixed to the first shaft 46 by means of a screw 58. Thus the upper arm 50 is pivotally supported for rotational movement with the shaft 46 around the axis thereof. The lower arm 52 is slidably mounted on the shaft 46 for vertical movement thereon. As will be more fully explained below, each mold assembly 32 includes means for axially aligning the molds 54 and 56 with respect to each other, for restraining relative angular movement therebetween, and for swinging the upper arm 50 and mold 54 to one side and out of axial alignment with respect to the lower mold 56 to facilitate the loading of lead-in wires 40 directly into the apertures 60 within the lower mold 56.

The control over the positioning of the molds 54 and 56 with respect to each other, and hence over the molding operation, is exercised by means of upper and lower cam tracks 66 and 68, the upper cam track 66 being disposed directly above the lower one. As shown in Figure 1, the upper control track 66 extends almost completely around the turret 30 and is disposed adjacent to the most extended portions of the mold assemblies 32 on the turret. The upper track 66 is broken only at the position in K in Figure 1 in order that the unloading operation be performed. The lower track is broken at the molding stations, F and H, as well as the unloading station K.

Two cam rollers 70 and 72, riding respectively on the two stationary cam tracks 66 and 68, are employed to move different parts of the mold apparatus 32 in the desired sequence in order to effect a molding operation.

The lower cam roller 72 rides on the lower cam track 68. This cam roller is fixed to an extension of the lower mold arm 52. Consequently, the vertical position of the lower track 68 determines the vertical position of the lower mold arm 52 and thus of the lower mold 56. And since the upper mold 54 is fixed to the first shaft 46, which is in turn maintained at a constant vertical position by virtue of the fact that the first shaft 46 is fixed to the C-frame 44, the vertical position of the lower mold determines the relative positioning of the molds with respect to each other. Since the upper mold is fixed in its vertical position, the raising of the lower cam roller 72 brings the molds closer together for effecting a molding operation, and the lowering of the lower cam roller 72 widens the distance between the molds.

As has been explained above, it is desirable to separate a partly formed glass member 38 from the mold or die members 54 and 56, which have partly molded it in order to play flames around and under the glass member. Upper mold disengaging means 83 (Figs. 14 and 16) and lower mold disengaging means 62 are provided for separating the glass member from the molds. Since a glass member 38 sticks to lead-in wires 40 along the areas of contact between these stem components, the glass member is disengaged from the mold members by the disengaging means 83 and 62 which push the lead-in wires partly out of the mold members. The glass member 38 is first separated from the upper mold 54 by the upper mold disengaging means 83, which will be described in detail below, and then separated from the lower mold 56 by the lower mold disengaging means or lead-in wire positioner 62.

The lead-in wire positioner 62, which is supported by the second shaft 48, is provided with push-out members or fingers 64 extending upwardly into the apertures 60 in the lower mold 56. The lead-in wire positioner 62 determines the reach of the lead-in wires 40 within the lower mold 56. One push-out finger 64 is provided for each of the apertures 60 in the lower mold. The push-out fingers 64 are adapted to be moved upwardly and either partly into the apertures 60 for moving the lead-in wires 40 to a higher position within the lower mold 56 or completely through the apertures 60 for ejecting the lead-in wires from the lower mold.

The upper cam roller 70 is mounted on the lead-in wire positioner 62. Thus the upper track 66 determines the lowermost mold position of the upper roller 70 and consequently the lowermost position of the lead-in wire positioner 62. The push-out fingers 64 of the positioner 62 are movable within the apertures 60 of the lower mold 56 and the ends of the push-out fingers are engageable with the bottom of the lead-in wires 40 which extend into the apertures in the lower mold. The reach of the fingers within the lower mold determines the position of the lead-in wires 40 in that mold.

The lead-in wire positioner 62 is operated in timed relation with the movement of the molding members 54 and 56. The fingers 64 of the positioner are raised within the apertures 60 in the lower mold 56 only after the lower mold has engaged the upper mold 54 in a molding operation and has been lowered away from the upper mold. The positioner 62 is provided with a horizontal extension block 78. The lower mold arm 52 is provided with a vertical extension block 80 which is disposed under the horizontal block 78 and in registry with it. In the normal, or resting position of a mold assembly, the mold members are disposed at a relatively great distance apart from each other, the upper and lower cam rollers resting, respectively, on the upper and lower cam tracks. In this position the horizontal extension block 78 is disposed a short distance above the vertical block 80 (as shown in Figure 8). When a molding or pressing operation is effected, elevating means 81 (which is described in greater detail below in connection with Figures 12 and 13) raises the lower mold arm 52 moving the lower mold 56 toward the upper mold 54.

When the lower mold arm 52 is raised, as is shown in Figures 6 and 7, the lower extension block 80 engages the horizontal block 78 raising it. The raising of the horizontal block 78 raises the positioner 62 within it. Since the lower mold arm and the lead-in wire positioner are raised together, the relative height of the positioner and the lower mold remains constant during the raising of the lower mold arm 52. Thus the position of the push-up fingers 64 in the apertures 60 of the lower mold 56, after the vertical block has engaged the horizontal block, remains constant while the lower mold arm is raised.

After the lower mold has been raised to a predetermined height, engaging the upper mold 54 in a molding operation, the lower mold arm is lowered. As the lower mold arm descends, the horizontal block 78, fixed to the positioner, rides on the vertical block 80 until the upper cam roller 70 of the positioner engages the upper cam track 66. As the lower mold arm continues its travel downwardly, the positioner remains stationary. The relative position of the positioner fingers 64 and the lower mold 56 changes. The fingers, in effect, move upwardly in the apertures 60 of the lower mold pushing the lead-in wires 40 upwardly.

The reach of the push-up fingers 64 within the lower mold apertures 60 may be adjusted by means of a screw 82. The screw is used to adjust the height of the vertical block 80 which in turn determines the point, during the travel of the lower mold arm, at which the vertical block engages the horizontal block. This determines the distance the fingers 64 reach into the lower mold.

Each of the mold assemblies 34 is provided with mold alignment members 84 and 85. Figure 5 shows first and second alignment arms 84 and 85 keyed to an alignment guide member 90. The alignment guide member 90 is provided with first and second alignment tracks 91 and 92 which engage, respectively, the first and second alignment arms.

As shown in Figure 4, the first alignment arm 84 is fixed to the lead-in wire positioner mechanism 62. Thus radial alignment of this mechanism with the lower mold 56 is maintained during the axial movement of the mechanism. More particularly, the push-up fingers 64 of the mechanism are kept aligned with the apertures 60 in the lower mold 56.

Similarly, as shown in Figure 10, the second alignment arm 85 is fixed to the lower mold arm 52. Consequently, radial alignment of this arm with the upper mold arm 50, and thus alignment of the apertures 60 in the two molds 54 and 56, is maintained during the axial movement of the lower mold arm.

The first and second alignment control arms engage their alignment tracks at portions thereof which are at a greater distance from the shaft than the positioner mechanism and lower mold arm to which they are fixed. Since the controlled members, namely the positioner mechanism 62 and the lower mold arm 52, are disposed at a smaller distance from the shaft 46 than the alignment control members a given arcuate play of the control members, caused by the necessary mechanical tolerances between the alignment arms and alignment tracks, will be transmitted to the controlled member as a smaller arcuate play. This allows relatively close alignment control over the controlled members while allowing for tolerances in the fit of the control members.

The loading operation

At the initial stations C (shown in Figure 1) the upper mold arm 50 is swung to one side, inwardly toward the turret axis. A tube 38 of moldable material such as glass is placed on the lower mold 56 and a plurality of lead-in wires 40 are then loaded into the apertures 60 in the lower mold. The upper mold arm 50 is then swung back to what may be termed its normal position where the upper mold 54 is disposed in axial alignment with the lower mold 56.

As has been explained in connection with Figure 6, the first shaft 46 is supported for rotational movement. Since the upper mold arm 50 and upper mold 54 are fixed to the top of the shaft they are rotated by a rotational movement of the shaft. The shaft 46 is fixed to a lever 86 by means of a pin 87. Consequently, the radial position of the shaft 46 is controlled by the position of the lever 86. A spring 88, connected between the lever 86 and the C-frame 44, produces a torque urging the lever 86 (in a direction letter N in Figure 11 of the drawing) against a stop 89 fixed to the C-frame 44. The lever 86 is provided with an adjustable screw 94 which engages the stop 89. By means of an appropriate setting of the screw 94, the upper mold may be maintained radially aligned in registry with the lower mold during the time that the mold arms are in their normal positions.

Figure 10 shows a partially cut-away side elevational view of a mold assembly 32 (at the station indicated by letter M in Figure 1). A third roller 96 extends downwardly from the lever 86. A third track 98 is positioned in engageable relation with the third roller 96 and extends along the initial stations, C. As shown in Figure 11, when the mold assemblies are moved to the initial stations the third rollers 96 of the mold assemblies engage the third track 98. The third track moves the third rollers in a direction outwardly from the turret axis. This rotates the levers 86 moving them outwardly from the turret axis which in turn rotates the upper mold arm 50 causing it to move inwardly about 45 degrees. Thus the upper molds 54 in the upper mold arms 50 are moved out of axial alignment with the lower mold 56 and stem components may be loaded directly into the lower mold.

When the mold assemblies leave the loading stations, "C," the third rollers 96 no longer engage the third track. The spring 88 then returns the upper mold 54 into alignment above the lower mold 56.

The molding operations

After passing through the loading stations, C, the mold assemblies 32 are moved by intermittent rotational movements of the turret 30 to a number of first heating stations D where flames of the type known as "soft" flames are played against the glass members 38 in the mold assemblies. The "soft" flames serve to gradually heat the glass to a temperature above its annealing point. The glass must be gradually heated until it attains its annealing temperature since a rapid heating of the glass, when it is below this temperature, is liable to introduce strains sufficient to break it.

The mold assemblies 32 then traverse second heating stations, E, where flames of the type known as "hard" flames are played against the glass 38. The heat of the flames at the second heating stations, E, is maintained at a temperature sufficient to bring the glass up to a partly plastic state, but not hot enough to deform the glass.

The mold assemblies, containing lead-in wires and a glass member in a partly plastic state, are then moved by the intermittent movement of the turret 30 to the first or light molding station, "F". Flames are provided at the first molding station to maintain the glass in the partly plastic state. At this molding station, as shown in Figure 6, the lower mold arm 52 is raised by mold actuating means 81 to a distance sufficient to press the softened glass tube 38 to a doughnut-like shape without further flattening the tube. The lower mold arm is then lowered and, as has been described above, the lower mold disengaging means 62 raises the lead-in wires 40. The first pressing operation is not designed to seal the glass tube to the lead-in wires. However, the raising of the lead-in wires by the disengaging means 62 insures that the now doughnut-shaped glass member is raised above the lower mold 56 in the event that the glass is heated to a temperature sufficient to cause it to flow and thus stick to the lead-in wires. The upper mold disengaging means 83 is then actuated. The disengaging means insures that the upper portions of the lead-in wires do not stick in the upper mold 54. Each of the mold assemblies are then brought to the third heating stations, G.

At the third heating stations, G, "hard" flames are played on the doughnut-like glass member to heat it to the still higher temperature of a completely plastic state. Each of the mold assemblies then reach a heavy molding station, H, where a doughnut-shaped glass member is molded to a button-like stem member. Flames are provided at each of the heavy molding stations, H, as well as at the stations G between the heavy molding stations, to maintain the glass member in a plastic state. As shown in Figure 3, each of the heating stations is provided with three gas burners 42. Successive stations have the burners thereof oppositely oriented so as to more evenly heat the glass member. This opposite orientation of successive groups of three burners gives substantially the same heat distribution (for a group of two successive stations) as would an array of six equally spaced (and cooler) burners at each station.

At each of the heavy molding stations, H, a mold assembly is raised by mold actuating means 81 which is of the same type as that used in raising the mold assembly at the first molding station, F. The actuating means 81 moves a lower mold 56 a relatively close distance to its cooperating upper mold 54, molding the glass member. The heavy molding operation is depicted in Figure 7 where a lower mold arm 52 is shown positioned at a relatively close distance to the upper mold arm 50. The lower mold arm 52 is lowered away from the upper mold arm after a molding operation.

As has been indicated before, each of the mold assemblies are moved to a series of annealing stations, J, after being subjected to the last molding operation. The unloading station, K, positioned after the last annealing station, is provided with unloading means 64, described below, for removing the finished stems from the mold assemblies. A last station, M, is provided where a suitable mechanism (not shown) may be mounted to check each of the mold assemblies for the presence of a stem which for any reason was not removed at the unloading station. The checking mechanism may, for example, be of a well known type having a microswitch actuated circuit for visually or audibly signaling an operation to advise of a jammed mold assembly.

In Figures 12 and 13 there is shown a mold actuating means or mechanism 81 for raising the lower mold arm 52 to perform a molding operation. The actuating mechanism 81 is mounted on a frame 100. The mechanism includes an actuating yoke 102 which, in its lowermost position (Figure 12) supports the lower cam roller 72 at the same height as the lower cam track 68. The yoke 102 is fixed to an alignment arm 104, which is slidably supported in order to restrict the yoke to vertical movement. The yoke 102 is fixed, by means of a connecting rod 108, to power transfer arms 110 and 112 which transfer power to the yoke from driving means 113 (which will be described in connection with Figure 23) through a drive cam 114 and a cooperating cam follower or roller 116. The drive cam 114 is rotatable by a drive shaft 118 to which it is fixed. The drive cam 114 includes a depressed or dwell portion. When the cam 114 is rotated to the position where the roller enters the dwell portion, the first power transfer arm 112 is moved toward the cam causing the second power transfer arm 110 to rise. The upward motion of the second arm 110 is transmitted to the yoke 102, through the rod 108, raising the lower mold arm and performing a molding operation. When the cam roller is moved out of the dwell portion of the cam, by the continued rotation of the drive shaft 118, the lower mold arm descends. A mold actuating mechanism of the type described is provided at each of the molding stations, F and H.

The upper mold disengaging mechanism

In Figures 14 to 16, there is shown the upper mold disengaging means or mechanism 83 for disengaging a molded stem 36 from the upper mold 54. The disengaging mechanism breaks the moldable member portion 38 of the stem 36 from the upper mold by engaging the upper ends of the lead-in wires 40 and pressing them downwardly after a molding operation has been effected and before the lower mold disengaging means 62 has disengaged the moldable member from the lower mold 56. The portions of the lead-in wires in the upper mold, which might otherwise stick in the upper mold apertures, are thus also lowered by the upper mold disengaging mechanism 83.

In Figure 14 there is shown a disengaging mechanism 83 having a ram guide 120 for engaging the upper ends of the lead-in wires 40. An apertured ram 122 is slidably mounted around the ram guide 120. The ram 122 is adapted to engage a lip 123 on the lowermost portion of the ram guide for urging the ram guide downwardly. The disengaging mechanism is provided with a ram restrainer 124 for holding the ram in an upward position above the ram guide lip 23 until the potential energy of the ram is to be used. The ram guide 120 is slidably mounted within a lever arm 126. A collar 127, which is fixed to the ram guide, determines the lowermost position of the ram guide. The lever 126 is fixed to a ram guide piston 128 which is mounted for vertical movement within a frame 129. The ram guide piston 128 extends into an air cylinder 130 which controls the vertical position of the piston 128 and thus also of the lever 126. A compression spring 132 is provided around the piston and between the lever 126 and a lower portion of the frame 129 for urging the piston in an upward direction when the air cylinder is unenergized. A second compression spring 134, positioned around the ram guide 120 and between the collar 127 and an upper portion of the frame 129, urges the ram guide downwardly when the lever 126 is lowered.

The structure of the ram restrainer 124 is shown in Figure 15. An air cylinder 136 is mounted on a lower portion of the frame 129. The air cylinder 136 is provided with a piston 138 to which the ram restrainer 134 is fixed. The air cylinder 136 includes a compression spring 140 for urging the restrainer toward the air cylinder when the air cylinder is unenergized.

Figures 17 to 22 show the upper mold restraining mechanism 83 in successive operating positions. In the first position, Figure 17, the ram restrainer 124 is moved in a direction away from the ram restrainer cylinder 136 and under the ram 122. The ram 122 is, in this position, maintained above the ram restrainer by the upward position of the ram guide piston 128 in the unenergized condition of the ram guide air cylinder. The energizing of the ram restrainer air cylinder 136 is effected by the actuation of a switch 142 (Figure 23) by a ram restrainer cam 144. When the drive shaft 118 moves the ram restrainer cam 144 into a position actuating the switch 142, a circuit is closed energizing a solenoid valve 146 through an appropriate electric cable 147. The energized valve 146, which may be any electrically controlled valve which passes air when electrically energized, admits air under pressure, from the supply hose 148, into a second hose 150 which is connected to the ram restrainer air cylinder 136.

The continued rotation of the drive shaft 118 then causes the ram guide 120 (Figure 18) to be lowered into engagement with the top of the lead-in wires 40 in the upper mold arm 50. The ram 122 is maintained in an up position by the ram restrainer 124 while the ram guide 120 is lowered. Figure 23 shows the means by which the ram guide 120 is lowered. A solenoid switch 152, actuated by a ram guide cam 154, energizes a solenoid valve 156 through an appropriate electric cable 157. The actuation of the solenoid valve 156 permits air under pressure to flow from the supply hose 148, through another hose 158, into the ram guide cylinder, energizing it. The energization of this air cylinder causes the ram guide piston 128 to move downwardly moving the ram guide 120 down and into contact with the upper ends of the lead-in wires.

In Figure 19 the next position of the upper mold restrainer mechanism 83 is shown in relation to the lower mold 56. In this position the lower mold has been raised to its uppermost position molding a glass member 38 into the desired form. The lower mold then starts its downward travel, Figure 20. After the lower mold has been lowered a relatively short distance the ram restrainer air cylinder 136 is de-energized. The ram restrainer 124 is moved toward the ram restrainer air cylinder 136 by the de-energization of the latter. This motion of the ram restrainer 124 allows the ram 122 to descend and strike the ram guide lip 123. The kinetic energy of the ram 122 is transferred to the ram guide lip 123 urging the lead-in wires 40 downwardly.

As the lower mold arm 52 continues its descent, Figure 21, the lower mold disengaging mechanism described above raises the glass member 38 from the lower mold. The ram guide 120 is then (Figure 22) raised by the upward travel of the ram guide piston 128, the ram guide piston being raised by the de-energizing of the ram guide air cylinder. The mold apparatus 32 under the disengaging mechanism 83 is now ready to be moved to a new position by a rotational movement of the turret.

The driving mechanism

Figures 23 and 24 illustrate the driving mechanism of the stem-making apparatus. As shown in Figure 23 the driving mechanism 113 includes a drive shaft 118 having a sprocket 160. A chain 162, which meshes with the sprocket 160, is adapted to be connected to a motor (not shown) for rotating the driving shaft 118. The rotational movement of the drive shaft is transmitted by a turret drive, which is represented in Figure 23 by a box 34, to the turret. The turret drive 34 may be any suitable intermittent drive. One intermittent drive which may be used is shown in copending application Serial No. 474,563, filed December 10, 1954, of E. F. Nickl and now issued as U. S. Patent 2,807,913.

As has been mentioned above, one cam 114 is used to transmit power to the lower mold arm elevating mechanism and two other cams 144 and 154 are used to transmit power, at the appropriate timed intervals, to members of the upper mold disengaging mechanism. Three of the cams, 166, 172, and 176, are used to transmit power to an unloading mechanism 164 and will be described in detail below.

Figure 24 is a chart illustrating the timing of the relative motions of the several mechanisms of the stem-making apparatus. The horizontal extensions of the graph lines in the chart, in the direction indicated by the legend entitled "Drive Shaft Rotation," indicate the relative positions of the several mechanisms and the timing of their periods of operation with respect to each other. It will be appreciated that the duration of active periods of the mechanisms may be lengthened or shortened provided the relative timing of the mechanisms is not substantially altered. The extended portion of the graph lines, in the direction indicated by the arrow adjacent to the legend entitled "Active Period of Each Drive," indicates only the fact that the power transfer means or drive is active for the duration of that extended portion. The sloping portions of the graph lines representing the mold apparatus elevating drive, the mold apparatus lowering drive, and the horizontal unloader drive are indicative of the fact that the movement of the mechanisms driven by these drives occurs over an extended interval during the rotation of the drive shaft.

It will be seen in the chart that all of the mechanisms directly powered by the drive shaft are inactive during the active period of the turret drive which intermittently rotates the turret. The lead-in wire positioner is not directly driven by the drive shaft and, as has been previously explained in connection with Figures 4 and 6, is maintained in its active or raised position in the lower mold 52 while the mold apparatus elevating drive is inactive.

Reference is now made to the graph lines enclosed in the bracket entitled "Molding Stations, F and H." After the turret drive has rotated the turret, moving each of the mold assemblies adjacent to a station, the ram restrainer drive is powered, holding the ram of the upper mold disengaging means in an up position. While the ram is supported in its up position the ram guide drive is powered, lowering the ram guide into contact against the upper ends of lead-in wires in the mold assembly below the guide. The mold assembly is then powered, raising the lower mold of the assembly to perform a molding operation. When the mold assembly is raised the lead-in wire positioner is lowered within the lower mold. This lower position is the inactive period of the positioner. After a molding operation has been performed, the elevating drive having raised the lower mold to its uppermost position, the lower mold is lowered. During the downward travel of the lower mold the ram restrainer drive is de-energized. The ram is thus released disengaging the molded member from the upper mold. The ram guide drive is then de-energized, causing the ram guide to be raised. The ram guide carries the ram with it during its upward travel. The mold apparatus is then lowered to a point where the lead-in wire positioner is raised. The raising of the positioner to its up or active position causes the positioner to disengage the lead-in wires from the lower mold. After the mold apparatus has been completely lowered the cycle is ready to be repeated.

Reference is now made to the graph lines enclosed by the bracket entitled "Unloading Station, K." The unloading mechanism 164 (Figures 25a, 25b, and 25c) includes three power transfer mechanisms or drives. The drives are powered by means of three cams 166, 172, and 176 (Figure 23). The cams are actuated in timed relation to first power a mold apparatus lowering drive. Then, while the lowering drive is active, horizontal and vertical unloader drives are successively energized. The vertical unloader drive is energized during the active period of the horizontal drive. And then, only after the vertical unloader drive is de-energized, the lowering drive is de-energized and the unloading cycle is over. As illustrated in Figure 27, this timing of the horizontal and vertical unloader drives moves an unloading member 170, to which the drives are connected, to four positions. The member is first moved in one horizontal direction to position $a$, then down to position $b$, back in the opposite horizontal direction to position $c$, and finally up to the starting position $d$.

The unloading mechanism

In Figures 25a, 25b, and 25c, there is shown a side elevational view of an unloading mechanism 164 according to the invention. The mechanism 164 includes a forked member 170 adapted to engage edge portions of the upper surface of a stem 36 which is partly removed from the upper mold 54 and which is held in the mold by the lead-in wires which extend into the mold. The forked member 170 is supported for both horizontal and vertical travel to permit the member to be spaced, in an out-of-the-way position, a sufficient distance from the mold assembly 32 to prevent interference with the latter during the intermittent movement of the mold assembly by the turret 30.

Figures 23 and 25c illustrate the driving means for the unloading mechanism 164. The mold apparatus lowering drive includes a cam 166 and cam follower 168. The horizontal unloader drive includes a cam 172 and cam follower 174 for transmitting power to a horizontal drive rod 198 by means of an arm 187. And the vertical unloader drive includes a cam 176 for controlling the energization of an air cylinder 178 (Figure 25a). The vertical unloader cam 176 controls the activation of a solenoid actuated air valve 180 by means of a switch 182 and an electric cable 183, the latter being connected between the switch and the solenoid valve. When the valve 180 is actuated, air from a supply hose 148 is admitted to the air cylinder 178 by means of a hose 184.

The first step in the operation of the unloader mechanism includes the lowering of the mold assembly at the unloading station. When the cam follower 168 of the mold assembly lowering drive encounters the depressed or dwell portion of the cam 166 against which it rides, the cam follower moves upwardly. The cam follower 168, which is held in contact against the cam by means of a spring 169, is fixed to an arm 175 which is pivotally supported by the frame 100. When the cam follower is raised by the cam 166 a mold lowering rod 186, to which the arm 175 is connected, is lowered. The rod 186 is fixed to a mold lowering yoke 188 (Figure 25b). The yoke is lowered when the rod is pulled down. Since the cam roller 72, which determines the height of the lower mold arm 52, is supported by the lowering yoke 188 at the unloading station, the lowering of the yoke effects a lowering of the lower mold arm. Thus the lower mold 56 is moved down to an out-of-the-way position during the unloading operation.

The unloading mechanism is provided with a lead-in wire positioner cam support 190 for completely ejecting a completed stem from the lower mold. The upper cam track for the positioner cam roller 70 is terminated at the station preceding the unloading station. The cam support 190 takes the place of the upper cam track at the unloading station and is provided with an adjustment screw 192 for controlling the height of the positioner with respect to the lower mold. The cam support, which is fixed to an unloader frame 194, is adjusted so that when the lower mold 52 is lowered by the yoke 188, the positioner members which extend into the lower mold are extended completely through the lower mold (Figure 9). Thus the stem is completely ejected from the lower mold.

Driving means are employed for actuating the forked member 170 in timed relation with the lowering of the mold assembly in order to unload the stem 36 from the upper mold. The forked unloading member 170 is controlled by the vertical movement of the horizontal drive rod 198. The rod is normally held in an up position by means of a spring 200 which urges the arm 187 upwardly. The rod is connected to an upper rod lever 202, which is in turn fixed to a first arm 203. The lever is pivotally supported on the frame 194 for a changing vertical movement of the rod 198 into a horizontal movement of the first arm 203. The first arm 203 is fixed to a second arm 204 into which a fork arm 206 is slidably mounted.

When the horizontal drive is energized, the rod 198 is lowered. This causes the lever 202 to pivot and move the first arm 203, and thus also the second arm 204, in a direction which is left in Figure 25a of the drawing. This horizontal movement of the second arm 204 is transmitted by the fork arm 206 to the forked member 170 causing the latter to move into a position directly above the glass portion of the stem 36. The horizontal movement of the second arm 204 also causes a frame 207, to which the air cylinder 178 is fixed, to slide along an extension of the unloader frame 194 thus allowing the fork arm 206 to move in a horizontal direction.

After the forked member 170 is moved horizontally (position $a$ in Figure 27), it is moved downwardly (position $b$) by the energization of the air cylinder 178. When the air cylinder 178 is energized a vertical drive piston 208 is moved, lowering the slidably mounted fork arm 206 and thus the forked member 170. When the air cylinder is de-energized, after the return horizontal movement of the forked member (position $c$), a compression spring 210, compressed between a lower portion of the frame 207 and a collar fixed to the piston 208, urges the piston and the forked member upwardly (position $d$).

As shown in Figure 26, a pipe 214 is provided adjacent to the stem 36 to blow the stem into a hopper 216 by means of a jet of compressed air.

It is apparent from the foregoing description of an electron device stem-making machine that a novel and advantageous apparatus is provided, not only for making relatively small electron device stems such as sub-miniature tube and transistor stems, but also for making electron tube stems of the larger, more conventional variety.

What is claimed is:

1. Apparatus for making an electron device stem comprising an intermittently rotatable turret and at least one mold assembly mounted on said turret adjacent to the outer periphery thereof, said mold assembly comprising a frame fixed to said turret, a shaft mounted on said frame, a pair of co-operating mold members mounted on said frame, one of said mold members being supported on and in spaced relation to the axis of said shaft, said one mold member being rectilinearly slidable parallel to said shaft, said mold members being mutually registrable for performance of a molding operation, and alignment means for preserving said one of said mold members from arcuate movement about said shaft, said alignment means including an alignment control member fixedly mounted relative to said frame and spaced from the longitudinal axis of said shaft a distance greater than said one mold member is spaced from said axis.

2. Apparatus for making an electron device stem comprising an intermittently rotatable turret and at least one mold assembly mounted on said turret adjacent to the outer periphery thereof, said mold assembly comprising a frame fixed to said turret, a shaft mounted in said frame, a pair of co-operating mold members mounted on said shaft, one of said mold members being arcuately moveable about said shaft, the other of said mold members being rectilinearly slidable parallel to said shaft, said mold members being mutually registrable for performance of a molding operation, and alignment means for preserving said other of said mold members in its said rectilinear motion parallel to said shaft, said alignment means including an alignment control member fixedly mounted relative to said frame and spaced from the longitudinal axis of said shaft a distance greater than said other mold member is spaced from said axis of said shaft.

3. Apparatus for making electron device stems comprising an intermittently rotatable turret and a plurality of mold assemblies mounted on said turret and adapted to travel a predetermined path, each of said mold assemblies comprising a frame member fixed to said turret, a shaft supported in said frame, a first mold member mounted on said shaft and radially spaced a predetermined distance therefrom and being adapted for arcuate movement about said shaft, a second mold member mounted on said shaft and radially spaced said predetermined distance therefrom and adapted for rectilinear movement parallel to said shaft, said first and second mold members being mutually registrable for the performance of a molding operation, alignment means preserving said second mold member from arcuate movement about said shaft, said alignment means comprising an arm mechanically connected to said second mold member and extending therefrom and a track member fixed relative to said frame, the free end of said arm being in slidable engagement with said track throughout said rectilinear movement of said second mold member, said track being spaced further from said shaft than is said second mold member.

4. Apparatus for making electron device stems comprising an intermittently rotatable turret and a plurality of mold assemblies mounted on said turret adjacent the outer periphery thereof, each of said mold assemblies comprising a frame mounted on said turret, first and second shafts mounted on said frame parallel to each other, first and second mold members supportedly mounted on said first shaft in spaced relation to the longitudinal axis thereof, said first mold member being adapted for arcuate movement about said first shaft, said second mold member being adapted for rectilinear movement parallel to said first shaft, said first and second mold members being mutually registrable for the performance of a molding operation, a work piece disengaging member extendable into said second mold member and mounted on said second shaft, a first alignment mechanism comprising an alignment arm fixed to said second mold member and an alignment control member fixedly mounted relative to said frame, said alignment arm being slidably engagable with said alignment control member, said alignment control member being disposed further from the axis of said first shaft than is said second mold member, and a second alignment mechanism comprising a second alignment arm fixed to said disengaging member and a second alignment control member fixedly mounted rleative to said frame, said second alignment arm being slidably engageable with said second alignment control member, said sceond alignment control member being disposed further from said second shaft than is said disengaging member.

5. Apparatus for making electron device stems comprising an intermittently rotatable turret and a plurality of mold members mounted on said turret adjacent the periphery thereof and adapted to travel in a predetermined path, each of said mold members comprising a C-shaped frame mounted on said turret, first and second shafts mounted parallel to each other in the extending arms of said C-shaped frame, a first arm mounted on said first shaft and being adapted for swingable movement about the axis thereof, a first mold member mounted on said first arm, a second arm mounted on said first shaft and being adapted for rectilinear movement parallel thereto, a second mold member mounted on said second arm, said swingable movement of said first arm being such as to permit registration of said first mold member with said second mold member for the performance of a molding operation, work piece disengaging means slidably mounted on second shaft, and extendable into said second mold member, and alignment means for restricting the movements of said second mold member and said work piece disengaging means to mutual coaxial rectilinear movement only parallel to said shafts and comprising a first alignment arm connected to said second mold member and extending therefrom, a second alignment arm connected to said work piece disengaging means and extending therefrom, and an alignment control member fixed relative to said frame and having a pair of tracks parallel to said shafts slidably receiving said alignment arms, said alignment control member being spaced further from said first shaft than is said second mold member and further from said second shaft than is said disengaging means.

6. Apparatus for making an electron tube stem, said apparatus comprising a turret mounted for rotation about a vertical axis and at least one mold assembly mounted on said turret adjacent the outer periphery thereof, said turret being adapted to be rotated by an indexing mechanism for effecting a regular intermittent rotation of said turret to bring said at least one mold apparatus successively adjacent a plurality of positions at predetermined ones of which stem-making operations are performed, said at least one mold assembly including a C-shaped frame, a shaft supported by said frame, upper and lower arms mounted on said shaft, upper and lower molds supported on said arms in registrable relation with each other, said upper arm being pivotally supported by said shaft for rotational movement with said shaft around the axis thereof, said lower arm being slidably supported on said shaft for vertical movement thereon, whereby said upper and lower molds are movable in registry with each other for performing a pressing operation, said at least one mold assembly further including means for restraining relative angular movement between said molds thereby radially aligning said molds with respect to each other, means fixed to said shaft for swinging said upper arm and mold out of axial alignment with respect to said lower mold for facilitating the loading of work pieces into said lower mold, and means connected between said swinging means and said lower arm for returning said upper mold into axial registry with said lower mold after the loading of work-pieces thereinto and before the performance of a pressing operation.

7. A disengaging mechanism for freeing from a mold a moldable member of a work-piece which has a portion thereof extending through said mold, said mechanism comprising a frame, a ram guide slidably mounted for vertical movement on said frame and having a lip fixed to the lowermost portion thereof, said ram guide being adapted to engage the uppermost portion of said work-piece portion, said frame being adapted to be mounted in a position wherein said ram guide is movable to a position extending the lowermost reach of said lip below said uppermost portion of said work-piece, a ram slidably mounted on said ram guide and engageable with said lip in the lowermost position of said ram on said guide, a horizontally movable ram restrainer supported on said frame and having a portion thereof extendable under said ram when said ram is disposed in an upward position on said guide, driving means adjacent said mechanism, means connected between a portion of said frame and said ram guide for urging said ram guide upwardly, ram guide actuating means connected to said driving means for intermittently energizing said ram guide for movement lowering said ram guide against the force of said upwardly urging means and into engagement with said uppermost portion of said work-piece, means connected to said ram restrainer for urging said restrainer out from under said ram, ram restrainer actuating means connected to said driving means for intermittently energizing said restrainer for movement under said ram against the force of said restrainer urging means, said driving means being adapted to first energize said ram restrainer actuating means thereby moving said ram restrainer under said ram and holding said ram in an upward position, then energizing said ram guide actuating means thereby lowering said ram guide and moving said lip into engagement with said uppermost portion of said work-piece component, then deenergizing said ram restrainer actuating means thereby moving said ram restrainer out from under said ram and releasing said ram for downward movement into engagement with said lip whereby said ram applies a sudden downward force to said work-piece component for transmission to said moldable member freeing it from said mold, and then de-energizing said ram guide actuating means thereby returning said ram guide and said ram to said upward position.

References Cited in the file of this patent
UNITED STATES PATENTS

| | | |
|---|---|---|
| 1,853,911 | McCabe | Apr. 12, 1932 |
| 2,195,483 | Franke | Apr. 2, 1940 |
| 2,312,003 | Schneider et al. | Feb. 23, 1943 |
| 2,518,924 | Niles | Aug. 15, 1950 |
| 2,662,344 | Knox | Dec. 15, 1953 |
| 2,718,095 | Reiter et al. | Sept. 20, 1955 |
| 2,700,154 | Dilts | Jan. 18, 1955 |